Sept. 17, 1935.  M. SMITH  2,014,990

CLUTCH

Filed Dec. 3, 1934  2 Sheets-Sheet 1

Minter Smith,
INVENTOR
BY Victor J. Evans & Co.
ATTORNEY

Sept. 17, 1935.                M. SMITH                    2,014,990
                                CLUTCH
                         Filed Dec. 3, 1934            2 Sheets-Sheet 2
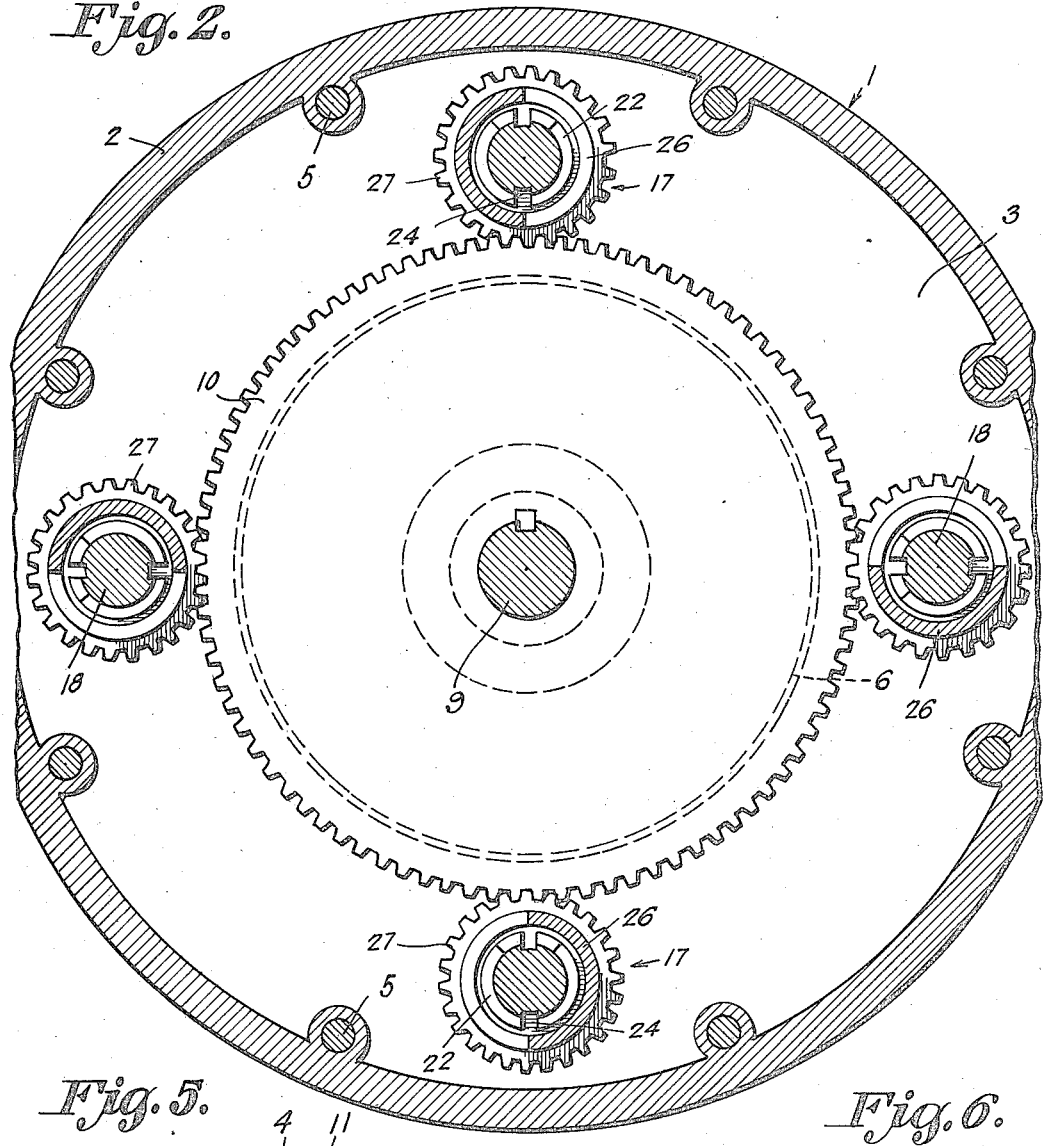
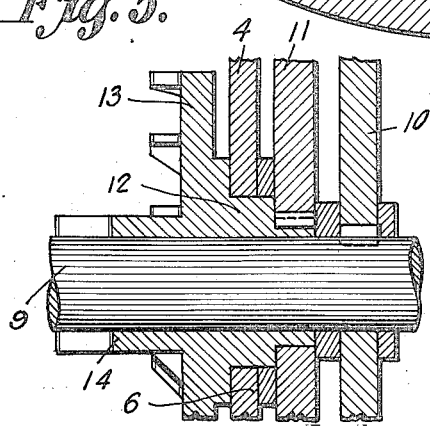
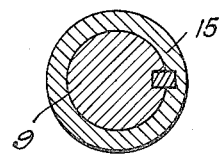
Minter Smith,
INVENTOR Patented Sept. 17, 1935

2,014,990

UNITED STATES PATENT OFFICE 2,014,990

CLUTCH

Minter Smith, Sulphur Springs, Tex.

Application December 3, 1934, Serial No. 755,825

6 Claims. (Cl. 74—290)

This invention relates to clutches, and has for the primary object the provision of a device of this character which will during its initial operation effect a gradual transfer of power from one element to another element and then provide a positive drive between said elements without the employment of friction.

Another object of the invention is the provision of gearing and combined load cushioning and drive units cooperating therewith to absorb road shocks and provide a non-frictional drive whereby slippage within the device is eliminated.

A further object of this invention is the provision of a clutch capable of providing either a direct drive between the drive and driven elements or a reduction drive between said drive and driven elements.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a clutch constructed in accordance with my invention.

Figure 2 is a transverse sectional view taken on the line 2—2 of Figure 1.

Figure 5 is a fragmentary vertical sectional view showing a part of the mechanism employed for connecting and disconnecting the driven element to one of the sun gears.

Figure 6 is a transverse sectional view taken on the line 6—6 of Figure 1.

Figure 1:
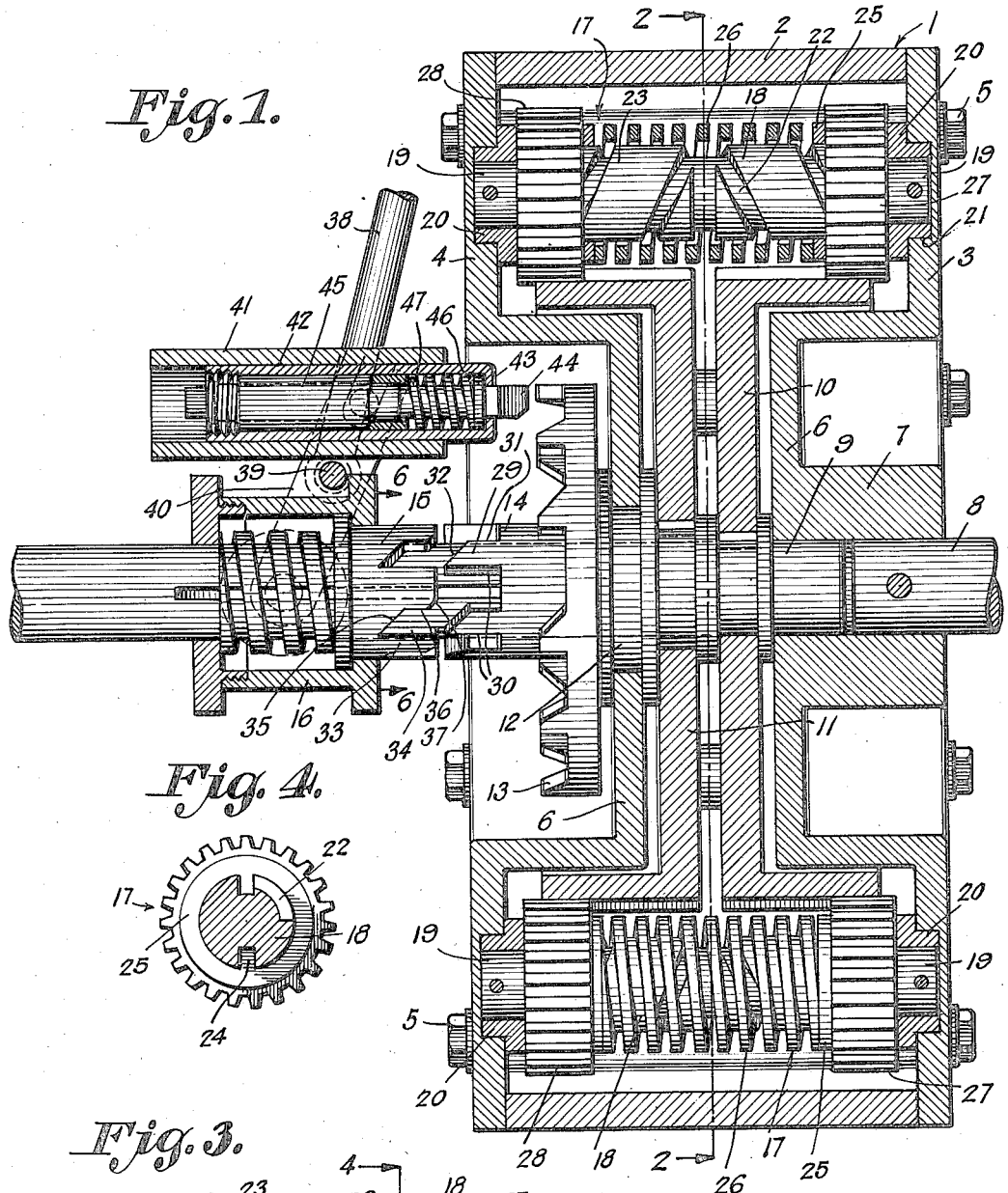
Figure 4:
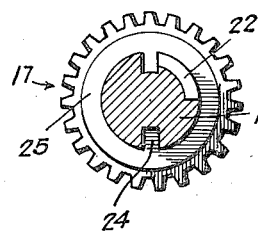
Figure 4 is a transverse sectional view taken on the line 4—4 of Figure 3.
Figure 3:
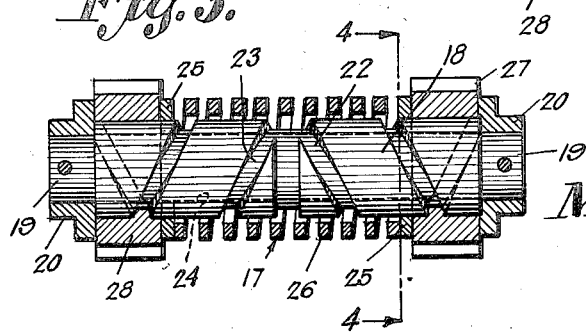
Figure 3 is a vertical sectional view illustrating one of the combined load cushioning and drive units.

Referring in detail to the drawings, the numeral 1 indicates a rotatable housing including an annular wall 2 and end walls 3 and 4 detachably secured thereto by tie rods 5. The end walls 3 and 4 are offset inwardly, as shown at 6, and the wall 3 has integral therewith a bearing 7 to receive the adjacent ends of drive and driven shafts 8 and 9, respectively. The drive shaft 8 is secured to the bearing 7 so that the housing rotates with said drive shaft while the driven shaft 9 turns freely in the bearing 7 and also extends through an opening formed in the end wall 4.

Sun gears 10 and 11 are arranged in the housing 1 with the driven shaft extending therethrough. The sun gear 10 is keyed to the driven shaft while the sun gear 11 is mounted to turn free on said driven shaft. A bearing-like element 12 is journaled in the opening of the wall 4 and is secured to the sun gear 11 and has formed integrally therewith a ratchet gear 13 located exteriorly of the housing 1. The bearing like element 12 also has integral therewith a clutch element 14 arranged exteriorly of the housing 1 and is adapted for cooperation with a clutch element 15. The clutch elements 14 and 15 are mounted on the driven shaft 9, the clutch element 14 being free to rotate relative to the driven shaft while the clutch element 15 is splined to said driven shaft and is provided with a throw-out collar 16 also mounted for sliding movement on the driven shaft.

The sun gears 10 and 11 are of the same diameter while the sun gear 10 has one more tooth than the sun gear 11. A plurality of combined load cushioning and drive units 17 are arranged between the housing 1 and the sun gears and each includes a shaft 18 having reduced ends to form pintles 19 to which are secured bearing elements 20 journaled in bearing seats 21 formed in the walls 3 and 4. The shaft 18 is provided with right and left hand feed threads 22 and 23 and also a groove 24 extending longitudinally thereof. Washers 25 are mounted on the shaft and each equipped with a tongue operating in the groove 24 and interposed between said washers and surrounding the shaft 18 is a coil spring 26. Mounted on the shaft between the washers 25 and the bearings 20 are planetary gears 27 and 28 provided with right and left hand feed threads, respectively, to mesh with the right and left hand feed threads of the shaft. The planetary gears 27 and 28 mesh with the sun gears 10 and 11. The spring 26 acts to position the planetary gears 27 and 28 against the bearings 20 and is compressed by said planetary gears during the operation of the clutch and which will be hereinafter more fully described.

The clutch element 14 has a series of teeth 29 each of which has a straight wall 30 extending the full length of the tooth while the opposite wall 31 extends aproximately one-half of the length of the tooth, the end of the tooth being beveled, as shown at 32. The clutch element 15 has a series of teeth 33 each of which has a straight side wall 34 and the opposite wall of said tooth is provided with angularly related faces 35, 36 and 37. The face 36 parallels the straight wall 34 while the faces 35 and 37 extend in opposite directions to each other with respect to the face 36. The purpose of constructing the teeth 29 and 33 of the clutch elements 14 and 15 is to permit a rapid movement between said clutch elements when the teeth thereof are partially meshed and to establish a lock drive between said clutch elements when the teeth are completely meshed. The position of the clutch element 15 with respect to the clutch element 14 is regulated through a control mechanism consisting of an operating medium 38 which may be in the form of a lever, foot pedal or any other device and is secured to a journaled shaft 39, the latter being carried by a suitable fixed support (not shown). The shaft 39 has secured thereto an arm 40, one end of which is suitably connected to the clutch throw-out collar 16. This connection can be of any well known character which will permit free rotation of the clutch throw-out collar 16 but still be capable of imparting endwise movement thereto by the swinging movement of the arm 40. Through the control medium 38 it is possible to disengage the clutch element 15 from the clutch element 14 or to position the clutch element 15 so that the teeth thereof partly mesh with the teeth of the clutch element 14 or bring about full or complete mesh of the teeth of said clutch elements.

Secured to the support heretofore mentioned is a bearing 41 slidably supporting a sleeve 42, one end of which is flanged, as shown at 43, to slidably support a ratchet dog 44. The inner end of the dog is slidably supported by an internal sleeve 45 suitably secured to the outer sleeve 42 and interposed between the sleeve 45 and a collar 46 secured to the dog 44 is a coil spring 47. The spring 47 yieldably supports the dog 44 in the position, as shown in Figure 1. Suitably connected to the sleeve 42 is the arm 40 so that on placing the operating medium in one position the dog 44 will be brought into engagement with the teeth of the ratchet gear 13 for the purpose of holding the sun gear 11 against rotation in one direction. It is to be understood that the dog 44 is only engaged with the ratchet gear 13 during a certain operation of the clutch and which will be hereinafter more fully described. Further, it is to be understood that the sun gear 11 can be connected and disconnected with the driven shaft 9 through the clutch elements 14 and 15.

Figure 1 shows the clutch disengaged or the drive and driven shafts disconnected thereby. To provide a direct drive between the drive and driven shafts, the teeth of the clutch elements 14 and 15 are brought into full meshing engagement through the manipulation of the operating medium 38. This brings about a driving connection between the sun gear 11 and the driven shaft, so that during the rotation of the drive shaft 8, the housing 3 rotates therewith and during several of the revolutions of the housing the planetary gears rotate about the sun gears. As the sun gear 10 has one tooth more than the number of teeth of the sun gear 11, the planetary gear 27 is caused to rotate a greater number of times than the planetary gear 28. This action of the planetary gear 27 will cause the latter to move axially of the shaft 18, gradually compressing the spring 26 until the pressure of said spring equals the load on the said driven shaft. When the pressure of the spring and load are equal the planetary gears 27 and 28 become locked together and rotate in unison so that a drive is provided between the housing 1 and the sun gears by said planetary gears and as said sun gears are locked to the driven shaft the latter is compelled to rotate with the drive shaft, thus providing a direct drive between the drive and driven shafts.

The device described is readily adaptable for motor vehicles in lieu of the conventional clutch and is to be connected between the conventional transmission and engine. It will, therefore, be seen that the clutch will provide between the engine and transmission a direct drive when desired and should free wheeling be desired the clutch elements 14 and 15 are adjusted relative to one another through the medium 38 so that the teeth thereof do not fully mesh. The teeth thus engaged will ratchet relative to one another should the driven shaft through the momentum of the vehicle turn faster than the drive shaft, thereby providing free wheeling and the driven shaft will be driven at the same number of revolutions with the drive shaft.

Further, it is to be noted that during the initial operation of the clutch to connect the drive and driven shafts and during the compressing of the springs to establish said drive the compressing action of the springs gradually absorbs the load and thereby prevent sudden starting of the driven shaft by the drive shaft.

Should it be desired to drive the driven shaft at a slower rate of speed than the drive shaft, the dog 44 is brought into engagement with the teeth of the ratchet gear 13, bringing about a positive lock of the sun gear 11 against rotation. Also at this time the teeth of the clutch elements 14 and 15 are not meshed. The drive will then be from the drive shaft, housing 1, planetary gears 27 and 28 and sun gear 10 to the driven shaft. Thus the clutch acts as a reduction gear between the drive and driven shafts, it being understood that the sun gear 10 is keyed to the driven shaft.

Having described the invention, I claim:

1. A clutch comprising sun gears, one having a greater number of teeth than the other, planetary gears engaging said sun gears, a shaft on which said planetary gears are mounted for axial movement only with relation thereto, and means offering a yieldable resistance to the axial movement of said planetary gears.

2. A clutch including drive and driven shafts, sun gears mounted on the driven shaft and one having a greater number of teeth than the other and fixed to said driven shaft, a clutch mechanism between the other sun gear and the driven shaft, a housing receiving said sun gears and fixed to the drive shaft, and combined load cushioning and drive units connecting the sun gears to said housing.

3. A clutch including drive and driven shafts, sun gears mounted on the driven shaft and one having a greater number of teeth than the other and fixed to said driven shaft, a clutch mechanism between the other sun gear and the driven shaft, a housing receiving said sun gears and fixed to the drive shaft, shafts journaled to said housing and each provided with right and left hand feed threads, planetary gears meshing with the sun gears and mounted on said last-named shafts for axial movement relative thereto, feed threads on said planetary gears meshing with the feed threads of the last-named shafts, and coil springs interposed between said planetary gears to cushion the load on the driven shaft and to bring about securing of the planetary gears of each last-named shaft whereby a drive will be established between the housing and the sun gears.

4. A clutch including drive and driven shafts, sun gears mounted on the driven shaft and one having a greater number of teeth than the other and fixed to the driven shaft, clutch elements mounted on the driven shaft and one secured to the sun gear mounted free on the driven shaft and the other clutch element splined to said driven shaft, an operating means for the last-named clutch element, a housing for the sun gears and fixed to the drive shaft, combined load cushioning and drive units connecting the sun gears to said housing.

5. A clutch including drive and driven shafts, sun gears mounted on the driven shaft and one having a greater number of teeth than the other and fixed to the driven shaft, clutch elements mounted on the driven shaft and one secured to the sun gear mounted free on the driven shaft and the other clutch element splined to said driven shaft, an operating means for the last-named clutch element, a housing for the sun gears and fixed to the drive shaft, and combined load cushioning and drive units connecting the sun gears to said housing, said clutch elements having teeth-shaped to provide a ratchet motion between said clutch elements when the teeth are partially meshed and to provide a locked condition between said clutch elements when fully meshed.

6. A clutch including drive and driven shafts, sun gears mounted on the driven shaft and one having a greater number of teeth than the other and fixed to the driven shaft, clutch elements mounted on the driven shaft and one secured to the sun gear mounted free on the driven shaft and the other clutch element splined to said driven shaft, an operating means for the last-named clutch element, a housing for the sun gears and fixed to the drive shaft, combined load cushioning and drive units connecting the sun gears to said housing, said clutch elements having teeth-shaped to provide a ratchet motion between said clutch elements when the teeth are partially meshed and to provide a locked condition between said clutch elements when fully meshed, a ratchet gear secured to the clutch element which is secured to one of said sun gears, and means to engage with the ratchet gear for effecting securing of said last-named sun gear against rotation in one direction to provide a reduction drive between the drive and driven shafts.

MINTER SMITH.